Figure 1:
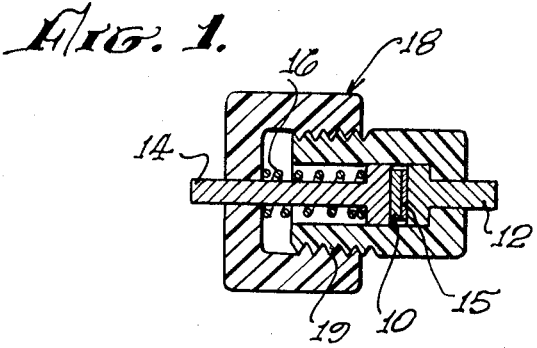

United States Patent

Hermann et al.

[15] 3,660,164
[45] May 2, 1972

[54] PRIMARY CELL UTILIZING HALOGEN-ORGANIC CHARGE TRANFER COMPLEX

[72] Inventors: Allen M. Hermann, La Canada, Calif.; Felix Gutmann, W. Pennant Hills, New South Wales, Australia; Alan Rembaum, Altadena, Calif.

[73] Assignee: California Institute Research Foundation, Pasadena, Calif.

[22] Filed: July 2, 1969

[21] Appl. No.: 845,616

Related U.S. Application Data

[63] Continuation of Ser. No. 643,883, June 6, 1967, Continuation-in-part of Ser. No. 556,900, June 13, 1966, abandoned.

[52] U.S. Cl. ............................136/83 R, 136/153, 136/137
[51] Int. Cl. .....................................................H01m 15/00
[58] Field of Search..................136/83, 100, 137, 153, 154, 136/6; 204/291, 294; 252/62.3, 500, 510, 511

[56] References Cited

UNITED STATES PATENTS

| | | | |
|---|---|---|---|
| 2,874,204 | 2/1959 | Morehouse et al. | 136/100 |
| 2,905,740 | 2/1959 | Smyth et al. | 136/83 |
| 3,057,760 | 10/1962 | Dereska et al. | 136/137 |
| 3,110,630 | 11/1963 | Wolfe | 136/6 |
| 3,346,423 | 10/1967 | Smyth et al. | 136/153 |
| 3,352,720 | 11/1967 | Wilson et al. | 136/137 |

OTHER PUBLICATIONS

Proceedings of the International Conference on Semiconductor Physics, Prague, 1960, Pages 844– 848, 850 and 851.

*Primary Examiner*—Anthony Skapars
*Attorney*—Charlton M. Lewis

[57] ABSTRACT

Primary cells capable of operating essentially in the solid state and utilizing reaction of a halogen with a metallic anode employ as cathode a charge transfer complex in which the acceptor component is the halogen and the donor component is an organic compound, typically aromatic or heterocyclic. Preferred anode materials include magnesium, calcium and barium.

The maximum current produced by such cells can be increased by surrounding them with an atmosphere containing more than the normal partial pressure of water vapor, or containing vapor of an organic liquid such alcohol, acetone and acetonitrile, having a high dielectric constant.

The physical properties of the charge transfer complex is improved by incorporating a polymeric matrix, which may or may not act also as the donor component of the complex.

6 Claims, 2 Drawing Figures

INVENTORS.
ALLEN M. HERMANN,
FELIX GUTMANN,
ALAN REMBAUM,

By Charlton M. Lewis

PRIMARY CELL UTILIZING HALOGEN-ORGANIC CHARGE TRANFER COMPLEX

This application is a continuation of the copending application, Ser. No. 643,883, June 6, 1967, which in turn is a continuation-in-part of the copending application, Ser. No. 556,900 filed June 13, 1966 under the same title, both now abandoned.

The invention described herein was made in the performance of work under a NASA contract and is subject to the provisions of section 305 of the National Aeronautics and Space Act of 1958, Public Law 85–568 (72 Stat. 435; 42 U.S.C. 2457).

This invention has to do with electrochemical cells by which chemical energy may be converted into electrical energy.

An important object of the present invention is to provide improved electrochemical cells in which all components may be in the solid state. The potential utility of such solid state batteries is well recognized, especially for construction of micro-miniature batteries, and several types of cells have been proposed. However, previously available solid state cells have not been fully satisfactory, largely because they were unable to produce voltages and currents of satisfactory magnitude and reliability.

The present invention makes use of a class of solid organic systems known as charge transfer complexes, or donor-accepter complexes. Such systems comprise at least two components that are rather weakly bound together by transfer of an electron from one component to the other. Since the resulting bond is relatively weak, such complexes normally exist in equilibrium with an appreciable proportion of their separate components which may be in ionic form. It is known that many such charge transfer complexes exhibit electronic conductivities in the range normally associated with semiconductors. We have found that such complexes with resistivities less than about $10^6$ ohm cm and preferably from about 100 to about $10^4$ ohm cm may provide an effective source of ions for maintaining an electrochemical reaction at the active electrode of a solid state electrical cell.

An important class of charge transfer complexes that are useful in the present invention comprises those in which the donor component is an organic compound, typically aromatic or heterocyclic, and the acceptor component is a halogen, typically bromine or iodine. The addition of a minor proportion of graphite to such compositions has been found to be helpful, especially for reducing the resistivity.

A further aspect of the present invention permits significant increase in the maximum currents obtainable from primary cells of the present general type by maintaining them in an atmosphere containing an abnormally high partial pressure of water vapor, or of the vapor of some other liquid having high dielectric constant.

Figure 2:
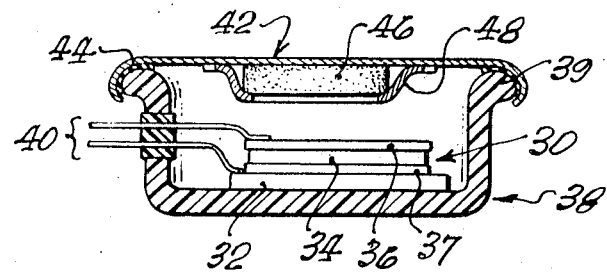

The invention will be described with reference to the accompanying drawings, in which:

FIG. 1 is a schematic axial section representing an illustrative test jig incorporating a primary cell in accordance with the invention; and FIG. 2 is a schematic axial section representing an illustrative primary cell with provision for controlled atmosphere in accordance with the invention.

In accordance with the present invention, electrochemical cells are typically prepared by placing a body of a charge transfer complex of the described type in electrical contact on one side with an active electrode and on the other side with a relatively inert electrode or contact member. The active electrode is of a material capable of reacting with ions of the acceptor component of the complex, the reaction taking place across a potential barrier separating two ground states of widely different energy. That energy difference is the free energy of formation of the product of the electrochemical reaction, from which the electrical voltage is derived. The inert electrode or contact may comprise substantially any electrically conductive material that is essentially inert with respect to the complex but forms an ohmic electron-supplying contact with it. Such an assembly maintains a difference of potential between the electrodes, with the inert electrode positive with respect to the active electrode. If the electrodes are connected by an external electric circuit a current flows in the circuit.

The charge transfer complex component of the present batteries may be considered to constitute an electrolyte between active and inert electrodes, and was so designated in the above identified parent application. However, it is believed more appropriate to apply the term "electrolyte" to the layer of reaction product that is typically formed in situ as a result of the described reaction which takes place between the charge transfer complex and the active electrode. From that viewpoint, the charge transfer complex is considered as the cathode, and the inert electrode is viewed as essentially a contact element providing an effective electrical connection between the cathode and the external circuit. For example, in a battery having as anode solid magnesium and as cathode a charge transfer complex comprising an organic material as donor component and iodine as acceptor component, negative ions of iodine react at the magnesium surface to produce a layer of solid magnesium iodide. That layer acts as an electrolyte in which current is conducted by mobility of ions, rather than by movement of electrons.

U.S. Patent No. 3,110,630, issued on Nov. 12, 1963 to William R. Wolfe, Jr., describes the use of charge transfer complexes in primary cells that depend upon a concentration gradient. However, the charge transfer complexes used by Wolfe consist of donor and acceptor components both of which involve organic moieties. Neither component is described as capable of reacting chemically with the material of an electrode. And Wolfe does not suggest the use of a halogen as one component of a charge transfer complex. Moreover, the cells described by Wolfe apparently produce only very moderate voltages per cell, such as are characteristic of cells that depend upon a concentration gradient for their operation. It therefore appears that the Wolfe battery operates on an entirely different principle from that of the present invention.

A particular advantage of solid state cells of the present type over previously available structures is the great flexibility in procedures by which they may be fabricated. In addition to more conventional assembly techniques, the charge transfer complexes of the present invention may in general be dissolved in conventional organic solvents and applied to the active electrode in liquid form, producing a solid layer upon evaporation of the solvent. The availability of such procedures for constructing batteries is particularly significant for producing highly integrated circuit structures.

A further aspect of the present invention provides improved structural characteristics and performance in batteries of the described type by incorporating the charge transfer complex in a polymeric matrix which is permeable to ions of the halogen. Such a matrix may comprise an inert highly polymerized organic material that is incorporated in the composition. For that purpose a wide variety of polymers may be employed, including, for example, polymerized olefinic hydrocarbons such as polyethylene and polypropylene, polymerized vinyl monomers and substituted vinyl monomers such as polyvinyl chloride, polymethyl methacrylate and polyacrylonitrile. Alternatively, the matrix may be provided by selecting as one component of the charge transfer complex a polymerized or polymerizable organic compound that acts as electron donor as well as providing a polymeric matrix. Any of the donor component moieties described more fully below may be rendered polymerizable by incorporation of suitable substituent groups such, for example, as vinyl groups, carboxylic groups, isocyanate groups and the like. Poly-N-vinylcarbazole and poly-2-vinylquinoline are examples of such dual function charge transfer complex components, additional examples being given below.

Another aspect of the invention has to do with means for controlling the electronic conductivity near the initial interface between the charge transfer complex and the active electrode, for example to prevent the local development of effective short circuits. Such control is obtainable by providing a layer of material at the active electrode that has a low electronic conductivity but is permeable to ions of the charge transfer complex of the type which react with the electrode. Illustrative materials for forming such permeable diaphragms are cross-linked polymerized hydrocarbons such as cross-linked polypropylene, polystyrene and the like. Such materials may be introduced as a distinct diaphragm structure between the active electrode and the charge transfer complex.

The effectiveness and utility of electrochemical cells in accordance with the present invention has been demonstrated by actual construction of a variety of specific cells and by direct measurement of the voltage produced under open circuit conditions and the current maintained during connection of the electrodes, either directly or through a resistive load. In some instances the time course of the current was measured under matched load conditions, that is, with a constant load resistance in the circuit equal to the initial internal resistance of the battery, typically of the order of 500 ohms for a test cell having an electrode area of about 1.5 cm². Such measurements indicate that for some cells the useful continuous working life, that is, the time till the current falls to one half its initial value, is 24 hours or longer.

In the preparation of cells, the solid charge transfer complex compositions may be produced by reacting halogen and the indicated donor component of the charge transfer complex in a volatile organic solvent that is inert with respect to the solute. The solvent is removed by evaporation, leaving the charge transfer complex as a solid. With suitable selection of materials the complex may be deposited directly from solution upon a substrate in the form of a film of desired thickness. Such film deposition is favored by selection of an organic polymer rather than a monomer as donor component, selection of a solvent that is not too volatile, and by relatively slow evaporation of the solvent. Deposition of the charge transfer complex as a solid film directly on the working face of the active electrode, with the inert contact element superposed by any suitable technique, greatly facilitates production of compact cells and permits their fabrication as part of an integrated circuit assembly. Under other conditions, for example when a relatively large volume of solution is evaporated with continuous stirring in a flask, the charge transfer complex tends to be precipitated as a granular solid. That solid can be compacted in a suitable die under a pressure of the order of 25,000 lbs./inch² to yield a solid pellet which is assembled in contact with the active electrode and contact element, typically under spring pressure. Alternatively, the donor component may be mixed directly, without use of a solvent, with the selected halogen in liquid or in finely divided solid form, the resulting solid complex being compacted as required.

Charge transfer complexes containing halogen as acceptor component and with electronic conductivities of suitable magnitude can be prepared using as donor components many different polycyclic aromatic compounds such as napthalene, anthracene, pyrene, perylene and violanthrene, for example all of which are condensed aromatic compounds in which the ring-forming atoms are exclusively carbon atoms; or polycyclic aromatic hydrocarbons containing heteroatoms such as nitrogen or sulfur, as exemplified by acridine, phenazine, phenothiazine and the like; or polycyclic aromatic hydrocarbons containing one or more electron donating substituents such as alkyl, alkoxy, amino or dimethylamino or tetramethylammonium groups. These groups improve the electron donating property of the polyclic aromatic hydrocarbon. Such compounds include, for example, mono- and diamino anthracene, dimethyl anthracene, diaminopyrene, dimethylaminopyrene and tetramethylbenzidine.

The substituted or unsubstituted polyclic hydrocarbons may be incorporated into a polymeric chain, or polymers may be synthesized having the above substituted or unsubstituted polycyclic hydrocarbons as side chains. Known polymers of this type include, for example, poly-N-vinylcarbazole, poly-2-vinyl-quinoline, poly-2-vinylpyridine, poly-4-vinylpyridine, poly-1-vinylnaphthalene, poly-2-vinylnapthalene and polyphenyl.

With charge transfer complexes having such organic molecules as donor component and having halogen as acceptor component, the active electrode may be selected from a wide variety of materials capable of reacting with halogen ions. Illustrative active electrode materials include, for example, the alkaline earth metals barium, calcium and magnesium, which are capable of producing open circuit voltages of approximately 2 to 2.5 volts, and such other metals as aluminum, indium, silver and tin, which produce somewhat lower voltages. The inert electrode or contact element is not critical, but is typically platinum, gold or carbon.

The proportions in which the halogen and organic components are combined in the charge transfer complex may vary over a wide range if the cathodic material is to be employed in the form of a solution or paste. For a solid cathode, a considerable range of proportions may also be employed, so long as sufficient halogen ions are made available for reaction at the active electrode and the resulting composition has satisfactory physical and electrical properties. Those physical properties are more readily obtainable in presence of a polymeric matrix, such as has been described, in the composition.

In the following description of illustrative cells in accordance with the invention, the inert contact element is Pt or C unless otherwise stated. Percentages are by weight and are in most cases only approximate. The electrode area was 1.6 cm². Voltages were measured under open circuit conditions and currents under short circuit conditions. The diaphragm, if used, comprised a layer of the order of 0.005 mm thick of cross-linked polypropylene initially interposed between active electrode and cathode. Measurements were made in the normal laboratory atmosphere, using a test jig of the type represented in FIG. 1. The charge transfer complex was formed into a disk 10 and placed between opposing faces of the anode 12, typically of magnesium, and the contact element 14, typically of graphite, to which electrical connections, not shown, were made in conventional manner. The electrolyte layer, formed in situ in the present measurements, is indicated at 15. The assembled components were pressed together by the spring 16 in the jig 18, typically formed of two nylon cups threaded together at 19.

1. Active electrode, Mg; cathode, iodine 50%, poly-N-vinylcarbazole 40%, graphite 10%. With no diaphragm, 1.30 volts, 0.15 mA; with a diaphragm as described above, 1.72 volts, 0.4 mA; with double thickness diaphragm, 1.55 volts, 1.0 mA.

2. Active electrode, Mg; cathode, iodine 57%, poly-N-vinylcarbazole, 43%; no diaphragm; 1.45 volts, 0.1 mA.

3. Active electrode, Mg; cathode, iodine 60%, perylene 40%. When freshly prepared, 1.5 volts, 0.3 mA. After aging for 3 days, 1.45 volts, 1.1 mA.

4. Active electrode, Ca; contact element Ni; cathode, iodine 67%, perylene 43%; 2.5 volts, 5.0 mA. Current dropped rapidly.

5. Active electrode, Mg; cathode, iodine 50%, poly-2-vinylquinoline 50%. Without diaphragm, 1.45 volts, 0.5 mA. With diaphragm as described above, 1.65 volts, 0.5 mA.

6. Active electrode, Mg; contact element, Ag; cathode, bromine 45%, poly-N-vinylcarbazole 45%, graphite 10%; 0.7 volt, 1.0 mA.

7. Active electrode, Mg; cathode, bromine 45%, poly-N-vinylcarbazole 45%, graphite 10%. With no diaphragm, freshly prepared, 1.9 volts, 0.006 mA; aged 24 hrs., 2.05 volts, 0.03 MA; with diaphragm, aged 24 hrs., 1.9 volts, 0.15 mA.

8. Active electrode, Ba; contact element, In; cathode, iodine 50%, perylene 50%; 2.4 volts, 0.01 mA.

9. Active electrode, Mg; cathode, iodine 70%, poly vinylpyridine 25%, carbon 5%; 1.75 volts, 1 to 30 mA.

10. Active electrode, Mg; cathode, iodine 50%, phenothiazine 50%; 1.75 volts, 6.5 mA.

Whereas an important advantage of the present invention, as already indicated, is that it can produce effective primary cells having no discernible liquid phase, the described charge transfer complexes of the invention may alternatively be employed in the form of a solution in a conventional organic solvent, suitable means being provided for containing the solution in contact with the active electrode and with the inert contact element. Or, as is common practice in many batteries of conventional type, an amount of liquid may be used which produces only a paste rather than a liquid solution. When liquid water is added directly to the charge transfer complex or to the interface between that complex and the active electrode, large initial currents are obtainable but tend to decrease rapidly to abnormally low values.

In accordance with a further aspect of the invention, it has been found that, even in the case of an essentially solid state battery, improved performance is obtainable by providing means for maintaining the cell in an atmosphere that contains an appreciable, and preferably substantially uniform, amount of a vapor of a liquid having a high dielectric constant. The value of the dielectric constant should be at least about 10. Such vapor may comprise water or a suitable inert organic compound such as acetone, acetonitrile or methyl or ethyl alcohol, for example. Acetonitrile has the particular advantage of containing no OH groups which might produce magnesium hydroxide. Whereas only a small partial pressure of such vapor, for example of the order of 0.01 atmosphere, is generally sufficient to stabilize the battery performance significantly, the maximum current obtainable tends to increase with the vapor pressure substantially to saturation. It is therefore preferred to provide an enclosure about the battery and to maintain in the enclosure a supply of liquid of the described class. That liquid may be contained, for example, within a membrane that is permeable to the vapor, or may impregnate a suitable absorbent material. Acetonitrile, for example, can be absorbed in rubber, and will then maintain an equilibrium partial pressure in the surrounding atmosphere.

The described atmospheric component, in concentration sufficient for effective operation, is provided inherently under all normal conditions of use by the water vapor that is normally present in the atmosphere. Under conditions of extreme dryness, such as can be produced in the laboratory but virtually never occur naturally, the current produced by the present cells may become so low as to be useful only for special purposes. On the other hand, by artificially increasing the atmospheric content of water vapor, or by supplying another suitable vapor, the maximum current obtainable from the present cells can sometimes be increased as much as an order of magnitude as compared to ambient conditions. Although such an artificial atmosphere requires some form of enclosure, the enclosure walls need not be immediately adjacent the cell structure as in the case of a liquid-containing cell. For example, if one or more miniature cells are formed as part of an integrated circuit structure, the enclosure may surround the entire integrated structure so that it does not complicate its detailed fabrication.

As represented schematically in FIG. 2, the cell 30, comprising anode 32, charge transfer complex cathode 34, contact element 36, and electrolyte layer 37, is mounted in the plastic cup 38 with electrical connections 40. The cover 42 is applied in sealed relation, as by rolling its edge over the rounded cup flange 39 with a sealing gasket 44. A vapor source is indicated in the form of an absorbent mass 46 supported in the frame 48 on cover 42. Mass 46 is saturated with the selected liquid of high dielectric constant before assembly of the cover. If preferred, the permanent cover assembly shown can be replaced by any desired type of demountable seal.

The following test results with an illustrative assortment of cell compositions illustrate the effect of controlled humidity or other controlled atmospheric conditions.

11. Active electrode, Ca; contact element, Ni; cathode, iodine 65% phenothiazine 35%; 2% relative humidity; 1.8 volts, 3–8 mA.

12. Active electrode, Ca; contact element, Ni; cathode, iodine 65%, perylene 35%; 2% relative humidity; 2.5 volts, 3 mA.

13. Active electrode, Li Mg alloy; contact element, Ni; cathode, iodine 65%, perylene 35%; 2% relative humidity; 1.7 volts, 16 mA.

14. Active electrode Mg; cathode, iodine 65%, phenothiazine 35%; atmosphere substantially saturated with acetone vapor; 1.3 volts, 1.3 mA.

15. Active electrode Mg; cathode, iodine 70%, polyvinylpyridine 25%, carbon 5%; over $CaCl_2$, 1.2 volts, 0.2 mA; 40% relative humidity, 1.5 volts, 1.5 mA; atmosphere substantially saturated with methanol (90%), 1.05 volts, 70 mA.

Whereas one aspect of the present invention permits the production of effective primary cells by direct deposition of a halogen-supplying cathodic material directly on an anode surface, with production of an electrolyte layer in situ by reaction of those materials, many aspects of the invention are also useful in combination with electrolyte layers that are prepared in advance and initially assembled between anode and cathode. The latter procedure permits a wide selection of electrolyte materials. For example, the present halogen-containing charge transfer complex compositions may be employed with a silver anode and a solid sulphur-containing electrolyte such as $Ag_3SI$, which has the advantage that silver iodide is soluble in it.

The specific examples given above are intended only as illustration of the invention, and may be varied in many respects in accordance with the known principles of electrochemistry without departing from the proper scope of the invention.

We claim:

1. In an electrochemical cell in which power is produced by reaction of negative ions of a halogen with positive ions derived from a metallic anode, a source of halogen ions for said reactions comprising a solid body of charge transfer complex containing as acceptor component said halogen, and in which said donor component consists essentially of
        a condensed polycyclic aromatic hydrocarbon in which the ring-forming atoms are exclusively carbon,
        and which is capable of forming with the halogen a solid charge transfer complex having an electrical resistivity less than about $10^4$.

2. A source of halogen ions as defined in claim 1, and in which said acceptor component is selected from the group consisting of bromine and iodine, and said metallic anode consists essentially of a substance selected from the group consisting of aluminum, barium, calcium, indium, magnesium and silver.

3. A source of halogen ions as defined in claim 1, and in which said body of charge transfer complex includes a minor proportion of finely divided graphite.

4. A source of halogen ions as defined in claim 1, and in which said donor component consists essentially of perylene.

5. In an electric cell comprising in combination a metallic anode, a cathode composition comprising a mixture of carbon and an organic compound, the improvement in which the organic compound is a charge transfer complex, which complex is the reaction product of a polynuclear aromatic compound having at least two fused rings as the donor and iodine as acceptor, and wherein the polynuclear aromatic compound of said complex is phenothiazine.

6. A cathode composition especially adapted for use in a cell which comprises a mixture of carbon and a charge transfer complex having a specific resistivity of about 100 ohm-cm., which complex is the reaction product of a polynuclear aromatic compound having at least two fused rings as the donor and an acceptor selected from the group of iodine and bromine.

* * * * *

PO-1050
(5/69)

UNITED STATES PATENT OFFICE
CERTIFICATE OF CORRECTION

Patent No. 3,660,164            Dated May 2, 1972

Inventor(s) Allen M. Hermann, Felix Gutmann, and Alan Rembaum

It is certified that error appears in the above-identified patent and that said Letters Patent are hereby corrected as shown below:

In the title change "TRANFER" to --TRANSFER--

Abstract, line 11, after "such" insert --as--

Col. 1, line 31, after "components" insert a comma

Col. 4, line 69, change "MA" to --mA--

Col. 6, line 13, change "1.05" to --1.5--

Col. 6, line 37, change "reactions" to --reaction--

Signed and sealed this 25th day of July 1972.

(SEAL)
Attest:

EDWARD M. FLETCHER, JR.          ROBERT GOTTSCHALK
Attesting Officer                Commissioner of Patents